April 1, 1958    R. S. HIGGINBOTHAM    2,828,716
POULTRY OPERATED PLATFORM ACTUATING FEEDING MEANS
Filed June 29, 1956                          2 Sheets-Sheet 1
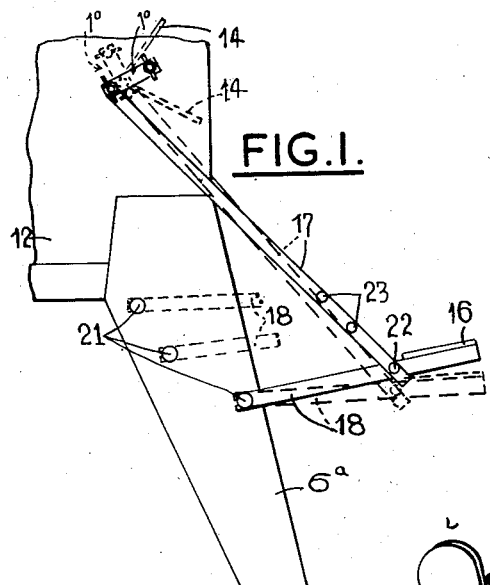
FIG.1.
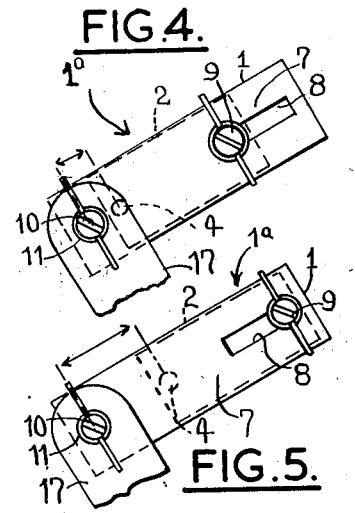
FIG.4.
FIG.5.
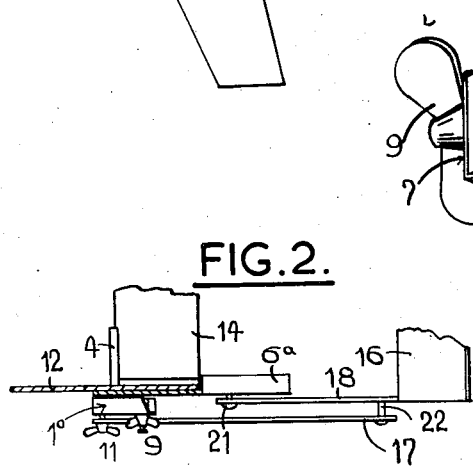
FIG.2.
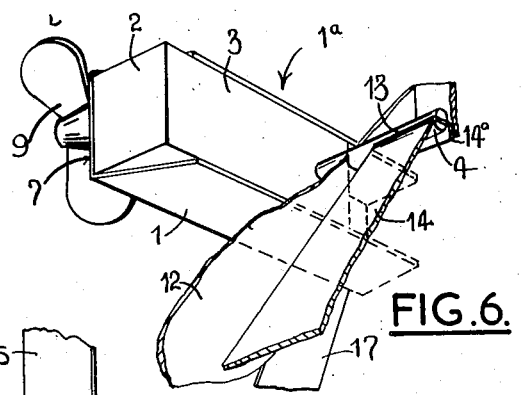
FIG.6.
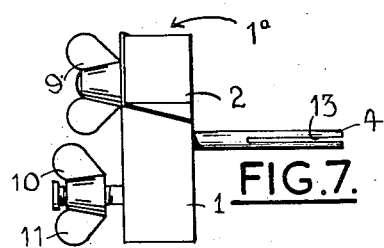
FIG.7.
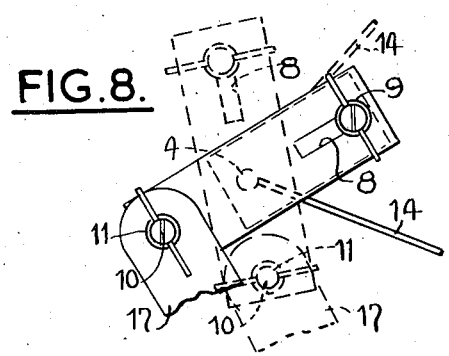
FIG.8.
INVENTOR
RICHARD S. HIGGINBOTHAM
BY
ATTYS.

April 1, 1958 R. S. HIGGINBOTHAM 2,828,716
POULTRY OPERATED PLATFORM ACTUATING FEEDING MEANS
Filed June 29, 1956 2 Sheets-Sheet 2
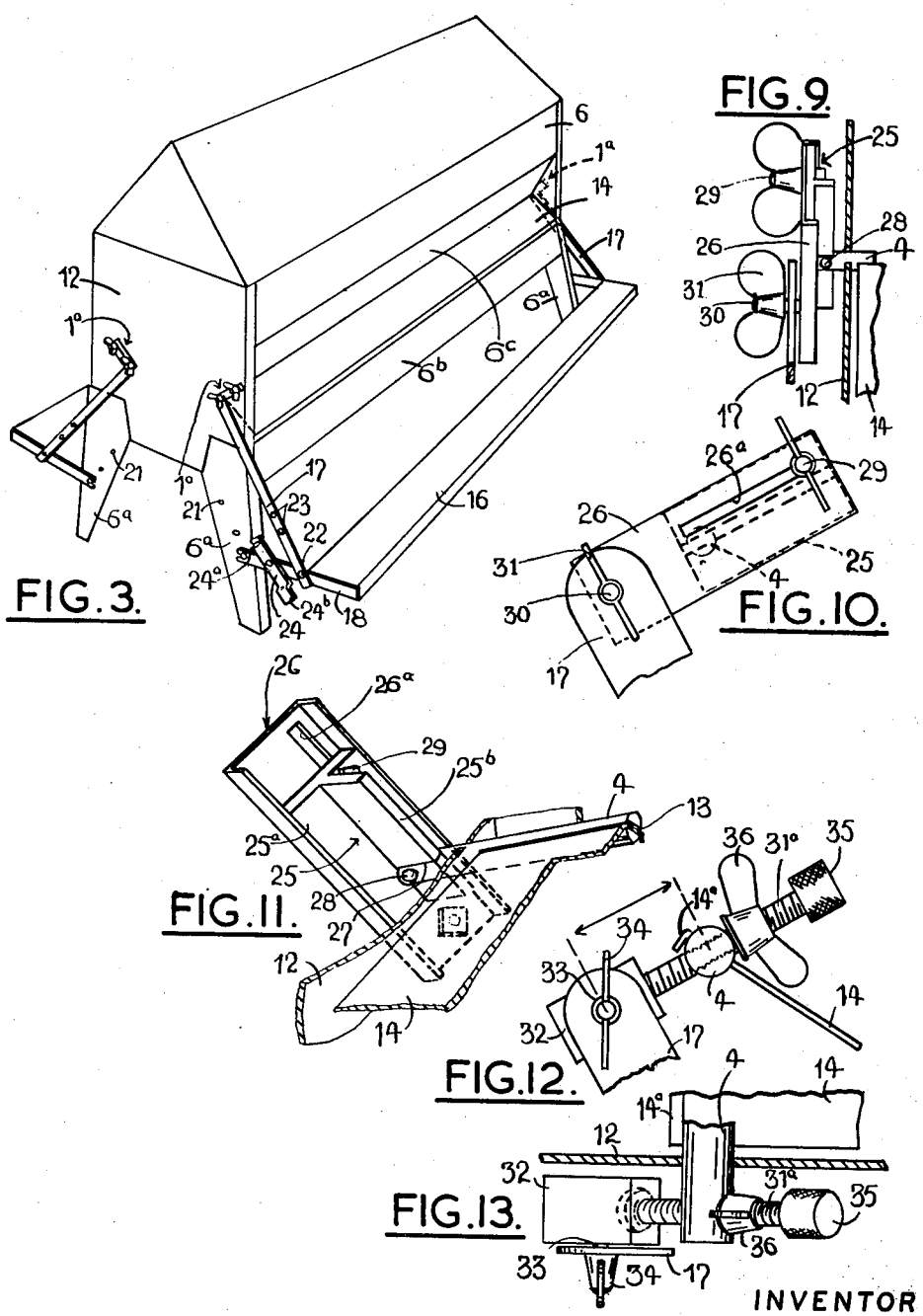
INVENTOR
RICHARD S. HIGGINBOTHAM United States Patent Office 2,828,716
Patented Apr. 1, 1958

2,828,716

POULTRY OPERATED PLATFORM ACTUATING FEEDING MEANS

Richard S. Higginbotham, Henderson, Auckland, New Zealand

Application June 29, 1956, Serial No. 594,778

Claims priority, application New Zealand December 15, 1955

8 Claims. (Cl. 119—55)

The invention relates to apparatus for use in operating the hinged lids of containers and in particular has reference to apparatus providing a ready means of opening or closing the lids of hoppers and bins, for instance poultry feed hoppers.

The primary object of the invention is to provide improved apparatus for use in operating the hinged lids of containers which besides providing for the automatic opening of a hopper lid under the influence of pressure or weight of a poultry bird and automatic closing upon the pressure or weight being relieved, also includes a ready and simple means of adjusting the lid to open under the influence of a pre-determined pressure or weight. In this latter direction the improved apparatus is capable of ready adjustment to suit the weight of poultry birds of varying weights such as fully grown birds, pullets or chickens.

A further object of the invention is to provide improved apparatus for use in operating the hinged lids of hoppers or the like which may be quickly and easily dismantled for instance for transportation or cleaning purposes and readily assembled.

According to one aspect of the invention the improved apparatus comprises an adjustable connection means adapted to be included in a connection between the hinged lid of a container and a platform movable on the container, the said lid being adapted to be opened, by pressure applied to the platform, or closed upon the platform being relieved of the said pressure, and the said adjustable connection means being capable of adjustment to enable the hinged lid of the container to be opened upon a pre-determined pressure being applied to the platform, and to close upon the platform being relieved of the said pressure.

According to a further aspect of the invention the improved apparatus comprises an adjustable connection means adapted to provide an adjustable connection between the axis of a hinged lid of a container and the point of suspension of a platform suspended from the adjustable connection means by means of which the lid may be opened or closed, the adjustable connection means being adapted to be adjusted to increase or decrease the distance between the hinged edge of the lid and the point of suspension of the platform so that the lid can be opened upon a pre-determined pressure being applied to the platform, and closed upon the platform being relieved of the said pressure.

The invention will now be described with reference to the accompanying drawings in which:

Fig. 1 is a part view in end elevation of a hopper showing the improved apparatus attached between a lid of a hopper and a platform suspended from the hopper.

Fig. 2 is an enlarged part plan view of Fig. 1.

Fig. 3 is a view of Fig. 1 in reduced scale and in part perspective.

Fig. 4 is an enlarged front elevation of the adjustable connection means.

Fig. 5 is a similar view to Fig. 4, but showing the adjustable connection means extended.

Fig. 6 is an enlarged perspective view of the rear of the adjustable connection means and illustrating its connection to the lid of the hopper.

Fig. 7 is an end view of Fig. 5.

Fig. 8 is a front elevation of the adjustable connection means, showing movement of the latter and hinged movement of the lid.

Fig. 9 is an enlarged front elevation partly in section of a modification of the adjustable connection means.

Fig. 10 is a side elevation of Fig. 9.

Fig. 11 is an enlarged perspective view of the adjustable connection means as illustrated in Figs. 9 and 10 and mounted on a container and attached to a lid of the container.

Fig. 12 is a side elevation of a further modification of the adjustable connection means, while Fig. 13 is a plan view of Fig. 12.

As previously mentioned the improved apparatus for use in operating hinged lids of containers is primarily intended for use with poultry feed hoppers wherein it is desired that the birds themselves may, by alighting on a platform, cause a hinged lid of the hopper to open under the weight of the bird, the lid closing upon the platform being relieved of the weight. In such hoppers it is usual to provide a hopper having a trough situated at least in one lengthwise wall of the hopper, the trough being closed by a hinged lid. A platform extending the full length of the hopper is suspended from both ends of the hopper and is connected to both ends of the hinged lid.

As illustrated in the drawings the adjustable connection means comprises an adjustable lever indicated generally as at 1a and provided in slidable sections. As shown more particularly in Figs. 4, 5 and 6 the lever 1a consists of a slidable member in the form of an open ended three sided channel member 1 which is slidable on a fixed member in the form of a block 2. From the side surface 3 of the block 2 exposed through the open side of the channel member 1 and toward one end of the block 2, there projects a spindle 4 which forms the actual pivotal mounting of the hinged lid (see Fig. 6) of a container such as a hopper or a bin 6 (see Figs. 1 and 3). The intermediate leg or surface 7 of the channel member 1, is slotted as at 8 toward one end of the latter, and a screw threaded hand bolt 9 is passed through the slot 8 and screw threaded into the block 2 (see Figs. 4 and 5). By means of arrangement so far described the block 2 may be slid within the channel member 1 for a distance limited by movement of the bolt 9 along the slot 8, and set in a selected position by screwing the hand bolt 9 inwardly so that the head thereof engages against the edges of the slot 8.

Toward the opposing end of the channel member 1 and on the same surface 7 of the latter as the projecting head of the hand bolt 9, there projects a second bolt and nut, referred to hereinafter as the attaching bolt 10 and lock nut 11.

The lever 1a as has so far been described, is adapted to be mounted on an end wall 12 of the hopper 6 with the spindle 4 pivotally projected through the wall 12 of the feed hopper 6 so that the said spindle 4 engages the inner and corner of the lid or flap 14 of the hopper 6 (see Figs. 6 and 7). To this end, the spindle 4 is slotted as at 13 to receive therein a flange, or turned down inner edge 14a of the lid 14 so that the spindle 4 will act as the axis or hinge of the lid 14 (see Figs. 6 and 7). One such lever 1a and spindle 4 pivotally supports each inner corner of the lid 14 (see Fig. 3).

With the spindles 4 of the levers 1a rotatably passed through opposed end walls 12 of the hopper 6 and supporting each end of the lid 14, of the hopper 6 to act as the axis or hinge of the lid 14, the channel member 1 and block 2 form a lever, one section of which extends from the spindles 4 in a direction substantially opposed to the direction of the lid 14 and at the end of which (hereinafter referred to as the outer end) is situated the attaching bolt and nut 10 and 11.

With a lever 1a and spindle 4 positioned at each end of the hopper 6 to pivotally support each end of the lid 14, the levers 1a are located on the exterior surfaces of the end walls 12 of the hopper 6, and a link 17 is loosely attached by an end to each attaching bolt 10 situated at the outer end of each lever 1a. The links 17 depend from the attaching bolts 10 and the platform 16 is supported between the opposed ends of the links 17 and immediately beneath the lid 14.

With the lid 14 of the hopper 6 closed, pressure may be applied to the platform 16 to draw the levers 1a in a downward direction, per medium of the links 17 (see dotted position Fig. 8). Such an action rotates the spindles 4 and raises the lid 14 of the hopper 6. The lid 14 is prevented from being raised beyond a vertical position by a suitable stop 6c, and upon the platform 16 being relieved of pressure, the lid 14 will close under its own weight. By loosening off the hand bolts 9 projecting from the blocks 2 and through the slots 8, and sliding the channel member 1 of the lever 1a on their respective blocks 3, the distance between each spindle 4 and each attaching bolt 10 which are the actual points of suspension of the platform 16, may be either increased or decreased (see arrows Figs. 4 and 5) so that pressure required to be exerted on the platform 16 to open the lid 14 may be varied. In other words, the combined weight of the platform 16 and the links 17 act to partially counterbalance the weight of the lid 14 and each adjustable lever 1a acts as an adjustment, so that additional pressure or weight required to open the lid 14 is dictated by the length of the sections of the levers 1a projecting away from the lid 14. Thus it is possible to set the levers 1a at a length wherein only a very light pressure is required to be exerted on the platform 16 to open the lid 14, or a heavier weight is required for such a purpose, and in the case of the apparatus being used in conjunction with a poultry feed hopper 6, the levers 1a may consequently be set to open upon a chicken alighting on the platform, or a pullet, or a fully grown poultry bird as the case may be.

The improved apparatus may also include, or be associated with a platform height adjustment means. In this direction the links 17, which are loosely connected to the attaching bolts 10, are also loosely connected to bracing arms 18 secured to each end of the platform 16, the bracing arms 18 distancing the platform 16 from the legs 19 of the hopper 6 (see Figs. 3 and 4). More specifically ends of the bracing arms 18 are secured to each end of the platform 16 and the free, or opposing ends of the bracing arms 18 are slotted as at 20 and engaged loosely over studs 21 on the legs 6a of the hopper 6. A bolt head 22 projects from the outer surface of each bracing arm 18 adjacent the platform 16, and each bolt head 22 is adapted to be loosely engaged through one of a series of apertures 23 in each link 17. By means of such an arrangement the platform 16 is suspended from the levers 1a and is held out, or distanced from the hoppers 6 beneath the trough 6b of the hopper 6 by the bracing arms 18. By arranging the slotted ends 20 of the bracing arms 18 on selected studs 21 and engaging the bolt head 22 of each bracing arm 18, in selected apertures 23 of the links 17 (see dotted positions Fig. 1) the height of the platform 16 from the ground level and from the trough 6b may be adjusted to suit the size of poultry birds being fed.

The loose connection of the links 17 to both the attaching bolts 12 of the levers 1a and the bracing arms 18 and the loose connection of the bracing arms 18 to the hopper legs 6a, enable the parts to be readily dismantled for cleaning, transport or storage purposes, and again readily assembled.

Where it is desired to lock the lid 14 in either a closed or opened position, one or both lock nuts 11 can be tightened on the attaching bolts 10 so that pivotal movement between the links 17 and the levers 1a ceases and the platform 16 is locked against movement.

As illustrated in Fig. 3 of the drawings each bracing arm 18 can be provided with a locking means in the form of a lever 24 to prevent unintentional disengagement of the bracing arms 18 from the studs 21 and the links 17. To this end a lever 24 is pivotally mounted adjacent its centre on a link 17 and adapted to engage over both the stud 21 on which each the free end of bracing arm 18 is engaged, and over the bolt head 22 on which each link 17 is engaged. More particularly such a lever 24 is provided with a slot 24a toward one end thereof and a recess 24b at the remaining end thereof. As illustrated in Fig. 3 the lever 24 can be pivoted to a position so that the slot 24a engages over the stud 21 to lock the bracing arm 18 from disengaging from the stud 21, while the recess 24b at the opposed end of the lever 24 passes over the bolt head 19 to prevent disengagement of the link 17 therefrom.

Figs. 9, 10, 11 illustrate a modification of the adjustable connection means. As illustrated more particularly in Fig. 11, an adjustable lever is provided wherein the fixed member is a section of angle iron 25 of T formation when viewed endwise. The T angle iron 25 is slidable within the slidable member in the form of a channel member 26 illustrated in Fig. 9 of the drawings. More particularly the crosspiece 25a of the T angle iron 25 is slidable in neat engagement within the channel member 26, while the leg 25b of the T angle iron 25 projects through the open side of the channel member 26, and a spindle 4 supporting one end of the lid 14 is secured to the said leg 25b to project outwardly therefrom (see Figs. 9 and 11). The outer or free end of the spindle 4 is slotted as at 13 as has previously been described to receive the lid 14 while further securing of the spindle 4 to the leg 25b of the T angle iron 25 is provided by means of a second slot 27 at the inner or opposed end of the spindle 4 engaged on the leg 25b. A bolt 28 is passed through the spindle 4 and leg 25b to lock the spindle 4 to the leg 25b (see Fig. 11).

The channel member 26 is slotted at 26a toward one end thereof, as in the case of the form of the invention illustrated in Fig. 6, and a bolt 29 fixed to the T angle iron 25, projects through the slot 28.

An attaching bolt 30 with lock nut 31 for attachment of the suspension link 17 is secured to the opposing end of the channel member 26. The arrangement is such that by sliding the channel member 26 on the T angle iron 25 the distance between the spindle and attaching bolt 31 carrying a suspension link 17, can be increased or decreased so that less or more pressure is required to be exerted on the platform 16 to open the lid 14 as has previously been described.

Figs. 12 and 13 illustrate a further modifiaction of the adjustable connection means, as illustrated an adjustable lever is provided in the form of a screw threaded bolt 31. The screw threaded bolt is screwthreaded through the portion of the spindle 4 carrying one end of the lid 14 projecting beyond the wall 12 of the container 6 so that a length or section of the bolt 31 can be extended outwardly from the spindle 4 in a direction substantially opposed to the direction of the lid 14. The end of the bolt 31 furthest from the lid 14 carries a block 32 turnably anchored on the bolt 31, the block 32 in turn carrying an attaching bolt 33, with a wing nut 34, to which the end of one of the links 17 of the platform 16 is loosely connected (see Fig. 13). The opposing or inner end of the bolt 31 is provided with a knurled hand nut 35 fixed thereon, and a wing nut 36 is screw threaded on the bolt 31 between the spindle 4 and the hand nut 35. The arrangement is such that with the spindle 4 rotatably passed through the wall 12 of a container 6 and supporting the rear edge of the lid 14 to act as the axis or hinge of the latter as has previously been described and illustrated in connection with the previous forms of the invention, and with a platform supporting link 17 loosely connected to the attaching bolt 35, the length of section of the bolt 31 extending from the spindle 4 to the block 32 acts as a counter lever to partially counterbalance the weight of the lid 14, in conjunction with the links 17 and platform 16. Pressure may be applied to the platform 16 as previously described, to raise the lid 14 by overcoming the weight of the latter. By turning the knurled hand nut 35 the counter lever section of the bolt 31, i. e. the section of the bolt 31 lying between the block 32 and the spindle 4, may be increased or decreased so that the lid 14 will open upon a predetermined pressure being applied to the platform.

The wing nut 36 is adapted to act as a lock to lock the bolt 31 in a set position relative to the spindle 4. More particularly, the wing nut 36 is moved to a position against the spindle 4 to lock the bolt 31 to the said spindle 4.

Referring now to the stop which limits upward movement of the lid 14 and to which reference has already been made, it is preferred that such a stop be provided by an inclined side section 6c of the hopper 6 (see Fig. 3), against which the lid 14 hits when opened. The inclined side section 6c arrests upward movement of the lid 14 at approximately the position as shown dotted in Fig. 8 and prevents each connected lever 1a and link 17 from being brought into alignment (see dotted position Fig. 8). Thus both the lid 14 and each connected lever 1a and link 17 are assured of returning to their original positions under the weight of the lid 14 upon the lid 14 being relieved of pressure. The action of the lid 14 hitting against the inclined side section 6c, also serves to shake down feed within the hopper 6 to the trough 6b.

What I do claim and desire to obtain by Letters Patent of the United States of America is:

1. An improved poultry operated platform actuated feeding means comprising a container having side walls, a lid, spindles rotatably mounted in said side walls and having one end fixed to one edge of said lid, said lid extending in one direction from said spindles, a lever mounted on each spindle, one end of the lever being mounted on the spindle and the lever extending in a direction to counterbalance the weight of said lid, a link pivotally suspended from the other end of each lever, said levers being adjustable for changing the distance between said spindle and said link, and a platform pivoted on said container to which the other end of said links are pivoted, whereby the lid is opened by pressure applied to the platform or closed when the platform is relieved of the pressure.

2. An improved poultry operated platform actuated feeding means as claimed in claim 1 in which each lever comprises a fixed member mounted on said spindle and extending in substantially the same direction from the spindle as said lid extends, and a slidable member slidable on said fixed member and extending along said fixed member and past said spindle in the opposite direction to the direction in which said fixed member extends from said spindle, said link being pivoted to the end of said slidable member on the opposite side of said spindle from said fixed member, and means connecting said fixed and slidable members for fixing said members to each other.

3. Apparatus as claimed in claim 1 in which said lever comprises a screwthreaded bolt passed through the projecting end of a spindle of the hinged lid of the container with a portion of the bolt projecting in a direction substantially opposed to the direction of the lid, pivot means on the end of said portion to which said link is pivoted, the said bolt being capable of adjustment to increase or decrease the distance between the pivot means and the spindle.

4. Apparatus as claimed in claim 1 and means for adjusting the height of the platform on the links.

5. Apparatus as claimed in claim 4 in which said container has a plurality of legs thereon and said platform is pivoted on the conatiner by a plurality of bracing arms slotted at their ends and a plurality of studs set at varying heights on each leg of the container and engageable by said arms.

6. Apparatus as claimed in claim 5 in which said link is provided with a series of apertures and a bolt head the platform engageable in said apertures in order that the platform can be set at a selected height from the ground level.

7. Apparatus as claimed in claim 6 and a lever pivotally mounted on each bracing arm, each lever being capable of pivotal movement so that one end of the lever will cover the stud on which the bracing arm is engaged, and the remaining end of the lever will pass over the bolt head on the end of the platform.

8. Apparatus as claimed in claim 7 in which the end of the pivotally mounted lever adapted to engage over the stud is slotted, and the opposing end of the said lever is provided with a recess.

References Cited in the file of this patent
UNITED STATES PATENTS 1,343,093    Shoultz _____ June 8, 1920

FOREIGN PATENTS 721,984    Great Britain _____ Jan. 19, 1955